UNITED STATES PATENT OFFICE.

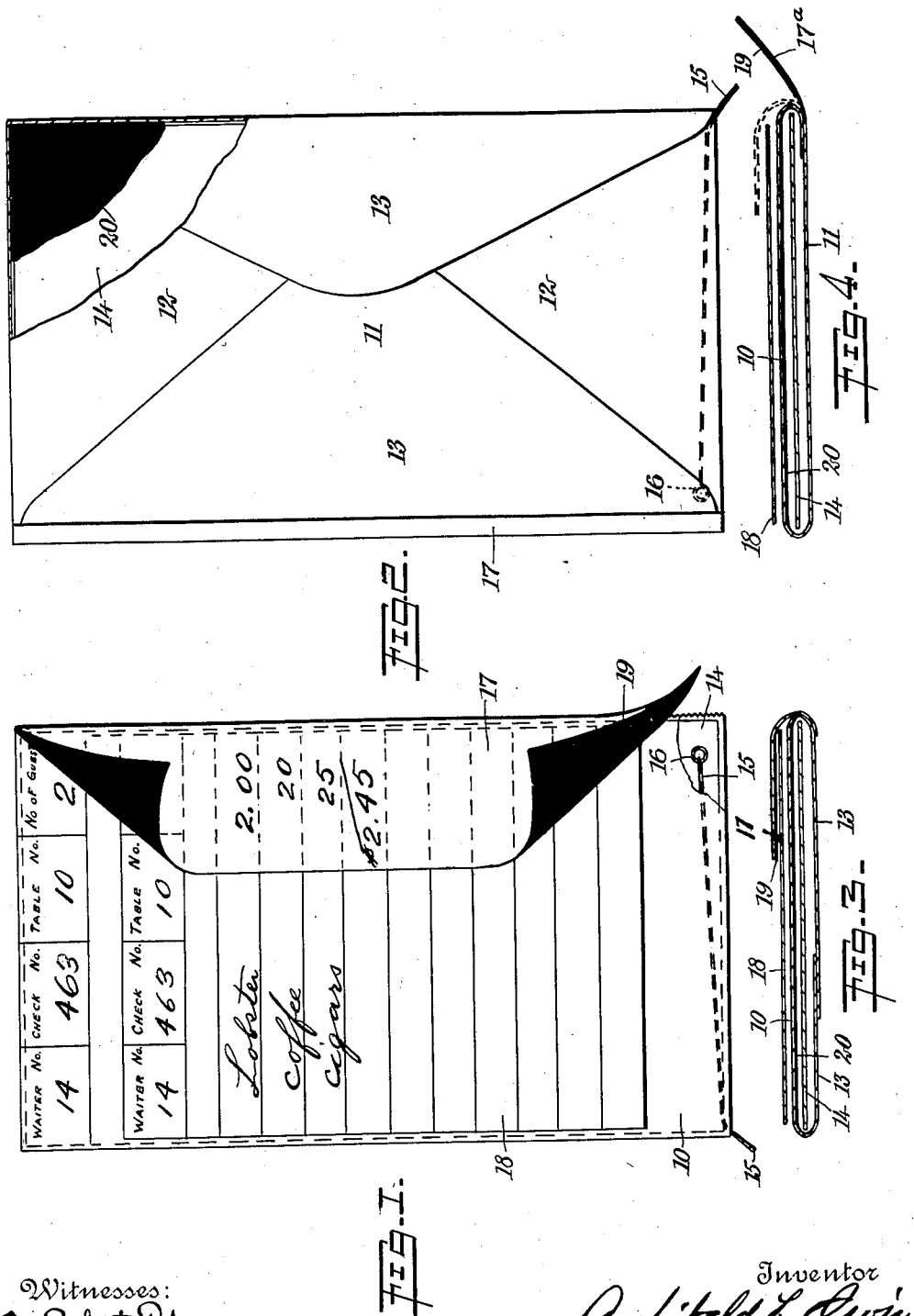

ARCHIBALD L. IRVIN, OF NEW YORK, N. Y.

MANIFOLDING ENVELOP-CHECK.

No. 927,543.  Specification of Letters Patent.  Patented July 13, 1909.

Application filed January 18, 1909. Serial No. 473,033.

*To all whom it may concern:*

Be it known that I, ARCHIBALD L. IRVIN, a citizen of the United States, and a resident of the city of New York, borough of Brooklyn, in the county and State of New York, have invented a new and Improved Manifolding Envelop-Check, of which the following is a full, clear, and exact description.

This invention relates to certain improvements in sales checks for use in hotels, restaurants, and the like, and the object of the invention is to render it impossible for the waiter to present a false bill to the patron without liability of detection.

In my improved device the sales check is inclosed within a sealed envelop and is provided with an extension terminating outside of the envelop, whereby the patron by means of the extension may open the envelop and remove the sales check. The entries are made on the sales check by means of a reproducing material, while the sales check is sealed within the envelop, and it is impossible to make any erasures on the check until after it is removed from the envelop; as the patron himself performs this last operation, it is evident that no opportunity is given the waiter for the fraudulent entry of amounts or the changing of amounts after they are once entered. The sales check is made separate and distinct from the envelop and the envelop is completely sealed, so that access cannot be gained to the check save by the tearing open of the envelop.

Reference is to be had to the accompanying drawings, forming a part of this specification, in which similar characters of reference indicate corresponding parts in all the figures, and in which—

Figure 1 is a face view of a device constructed in accordance with my invention, and showing an order slip in place; Fig. 2 is a rear view of the envelop, a portion thereof and a portion of the inclosed sales check being broken away; Fig. 3 is a transverse section through the envelop; and Fig. 4 is a transverse section through a modified form of envelop in which the flap or extension is formed integral with the body.

In the form shown in Figs. 1, 2 and 3, I employ an envelop which may be constructed in substantially the same manner as an ordinary envelop, that is, it has a face 10 and a back 11 formed of end flaps 12, 12 and side flaps 13, 13, sealed together. The particular construction of the envelop is of no special importance, as any form of envelop which may be completely sealed may be employed. Before sealing the envelop there is inserted therein a sales check 14 of only slightly smaller size than the envelop. The sales check is preferably made of slightly thicker or stiffer material than the envelop and is held against any material movement within the envelop by reason of its engagement with the edges. The sales check is provided with an extension terminating outside of the envelop, by means of which the envelop may be opened and the sales check removed. This extension is preferably a string or small wire 15, extending across one end of the envelop inside of the latter. One end of the string or wire is secured to the sales check in any suitable manner, as, for instance, by means of an eyelet, and the opposite end of the string or wire extends through the corner of the envelop to the exterior thereof. By pulling downwardly on the string, the end of the envelop is first torn open, and by continued pulling the sales check is drawn from the envelop. The tearing open of the envelop and the removal of the sales check are thus accomplished simultaneously by the patron and in a simple and easy manner.

The envelop carries at one edge thereof a flap or extension 17 normally folded adjacent the face 10 of the envelop and extending from the upper to the lower edge thereof. This flap or extension may have one edge thereof pasted to the envelop as illustrated in Fig. 3, or the envelop may be so cut as to form a flap 17ª integral therewith as illustrated in Fig. 4. The flap along the edge thereof adjacent the envelop is provided with an indicated line of separation in the form of either a row of perforations, a weakened line, or a printed line, with instructions for tearing along the same.

In connection with the envelop I employ a sales slip 18, designed to be placed in engagement with the surface 10 of the envelop and beneath the flap 17, as clearly indicated in Figs. 1 and 3. The flap 17 has its under surface, that is, the surface adjacent the face 10 of the envelop, provided with a coating 19 of any suitable reproducing material and within the envelop is a reproducing material 20, intermediate the envelop face 10 and the sales check 14. This reproducing material 20 is preferably carried by the face 10 of the envelop, but it is evident that a separate carbonized sheet may be inserted within the envelop, if desired.

The envelop, the check and the sales slip may have any suitable heading printed thereon, and may be ruled and lined to receive the different items. Preferably, each of them bears a space for the entry of the table number, the check number, the number of guests to whom the order is served, and the like.

In the use of my improved device, the sales slip 18 is placed with its edge beneath the flap or extension 17 and the names of the different articles ordered are written on the sales slip. The prices of these articles are entered on the flap 17 directly opposite to the names of the respective articles. Upon writing the articles on the slip 18, the reproducing material 20 will cause the same names to be duplicated on the sales check 14, and the writing of the amounts on the flap 17 will duplicate these amounts on the sales slip 18, by reason of the reproducing material 19, and also upon the sales check 14 by means of the reproducing material 20. Thus, it is only necessary to write the amounts once and they are copied on both the sales slip and the sales check. When the entire order has been given or any desired portion thereof, the sales slip is turned in to the kitchen as a receipt for the articles delivered to the waiter. If other articles are ordered later, a second sales slip is inserted in place and the new articles ordered are entered on lines below the lines upon which the first articles were entered. The figures on the flap 17 serve to indicate the line upon which the last entry was made. After the meal is over and the check is to be presented to the patron, the waiter adds up the amounts on the flap or extension 17 and enters the total below the last item, and this total will be duplicated within the envelop upon the check 14. The waiter then tears off the flap 17 along the indicated line of separation, and presents the envelop to the patron. The patron takes the envelop in one hand and pulls on the string with the other, so as to first open the envelop and then withdraw the check. It is unnecessary for the patron to soil his finger by extending it into the envelop to pull out the check and the opening of the envelop does not expose any of the reproducing material to view. It is impossible for the waiter to make any changes in the bill or to even see or touch the latter until after the patron removes it from the envelop and hands it to the waiter with the money. The check is thus in a clean and sanitary condition when handed to the patron, as it has never been exposed to the soiled pocket or hands of the waiter.

It is evident that a series of envelops may be held in any suitable form of binder or holder and that a series of the slips 18 may be held in the same binder in operative relation thereto.

Having thus described my invention, I claim as new and desire to secure by Letters Patent:

1. In a manifolding device, the combination of a sealed envelop, a sales check separate therefrom and inclosed therein and having an extension terminating outside of the envelop and by means of which the envelop may be opened and the check removed at one operation, and a reproducing material within the envelop and in copying relation with the sales check, whereby when articles purchased and purchase price are recorded on the outside of the envelop contiguous thereto, a copy is made on the sales check, said envelop having a flap for receiving said purchase price and separated from the body of the envelop by an indicated line along which it is adapted to be detached.

2. In a manifolding device, the combination of a sealed envelop, a sales check separate therefrom and inclosed therein and having an extension terminating outside of the envelop and by means of which the envelop may be opened and the check removed at one operation, a reproducing material within the envelop and in copying relation to the sales check, and a flap or extension carried by the envelop at one edge thereof and disposed adjacent one face of the envelop and having the under surface presenting a reproducing material.

3. In a manifolding device, the combination of a sealed envelop, a sales check separate therefrom and inclosed therein, a reproducing material within the envelop and in copying relation to the sales check, a string secured adjacent one corner of the envelop and disposed within the envelop along one edge thereof and terminating outside of the envelop, and by means of which the envelop may be opened, a reproducing material within the envelop and in copying relation to the sales check, a flap or extension carried by the envelop at one edge thereof and disposed adjacent one face of the envelop and having the under surface presenting a reproducing material and a sales slip adjacent the face of the envelop and extending beneath the free edge of said flap or extension.

In testimony whereof I have signed my name to this specification in the presence of two subscribing witnesses.

ARCHIBALD L. IRVIN.

Witnesses:
ALICE GUNNISON,
CLAIR W. FAIRBANK.